(12) United States Patent
Leibon et al.

(10) Patent No.: US 8,290,845 B2
(45) Date of Patent: Oct. 16, 2012

(54) SYSTEM AND METHOD FOR PRESENTING QUASI-PERIODIC ACTIVITY

(75) Inventors: Gregory David Leibon, Post Mills, VT (US); Katherine Beck Harris, Somerville, MA (US); Mark Jeffrey Waks, Burlington, MA (US)

(73) Assignee: FIS Financial Compliance Solutions, LLC, Jacksonville, FL (US)

( * ) Notice: Subject to any disclaimer, the term of this patent is extended or adjusted under 35 U.S.C. 154(b) by 176 days.

(21) Appl. No.: 12/908,680

(22) Filed: Oct. 20, 2010

(65) Prior Publication Data

US 2012/0101926 A1 Apr. 26, 2012

(51) Int. Cl.
*G06Q 40/00* (2012.01)
*G06F 7/00* (2006.01)

(52) U.S. Cl. .............................. 705/35; 705/45; 235/376
(58) Field of Classification Search ................... 705/35, 705/45; 235/376
See application file for complete search history.

(56) References Cited

U.S. PATENT DOCUMENTS

| | | | |
|---|---|---|---|
| 6,181,814 B1 * | 1/2001 | Carney | 382/137 |
| 6,965,886 B2 | 11/2005 | Govrin et al. | |
| 7,263,506 B2 | 8/2007 | Lee et al. | |
| 7,383,215 B1 | 6/2008 | Navarro et al. | |
| 7,427,016 B2 * | 9/2008 | Chimento | 235/376 |
| 7,788,195 B1 | 8/2010 | Subramanian et al. | |
| 7,813,937 B1 | 10/2010 | Pathria et al. | |
| 7,830,382 B2 | 11/2010 | Cirit et al. | |
| 7,831,703 B2 | 11/2010 | Krelbaum et al. | |
| 7,849,029 B2 | 12/2010 | Crooks et al. | |
| 2005/0097051 A1 | 5/2005 | Madill, Jr. et al. | |
| 2008/0077515 A1 | 3/2008 | Zoldi et al. | |
| 2009/0044279 A1 | 2/2009 | Crawford et al. | |

OTHER PUBLICATIONS

Fenton, Mike (It's Time for Check Fraud Detection 2.0. (Perspective), Bank Technology News, v22, n3, p. 30 Mar. 1, 2009).*

* cited by examiner

*Primary Examiner* — Jagdish Patel
(74) *Attorney, Agent, or Firm* — Finnegan, Henderson, Farabow, Garrett & Dunner L.L.P.

(57) ABSTRACT

Systems and methods for presenting fraud detection information are presented. In one example, a computer system analyzes empirical data to detect potentially fraudulent activity and alerts users of the potentially fraudulent activity via a fraud detection user interface. The fraud detection user interface determines a set of user interface components to suitable to present the potentially fraudulent activity and presents facts associated with the potentially fraudulent activity to a user for further analysis and investigation.

20 Claims, 13 Drawing Sheets

SYSTEM AND METHOD FOR PRESENTING QUASI-PERIODIC ACTIVITY

BACKGROUND

1. Field of Invention

Aspects of the present invention relate to systems and methods for managing risk by detecting fraudulent activity and more particularly to apparatus and methods for presenting analytically-driven fraud detection information to a user via a user interface.

2. Discussion of Related Art

Fraudulent activities belonging to various categories are a significant issue for a wide variety of business concerns. For instance, within the U.S. retail industry, shrink due to employee theft totals close to $16 billion annually. While in the U.S. healthcare industry, waste and abuse amounts to between $125 and $175 billion annually. Similarly, the U.S. financial sector is plagued with frauds including check fraud, ATM fraud, debit fraud and credit fraud. For example, check fraud, which is a perennial problem in the financial sector, amounts to approximately $1 billion in losses annually.

Defrauders utilize checks to perpetrate frauds in several ways. For instance, one category of fraud, referred to in the art as "On-Us" Fraud, involves presentment of fraudulent checks that are drawn on accounts held by the bank. These checks may be forged, altered or outright counterfeits. If honored, "On-Us" checks result in losses to the bank.

Another category of deposit account fraud involves new account scams, account takeovers and other schemes that involve defrauding accounts and gaining access to the funds they contain. In these situations, checks are drawn on a bank other than the bank at which it is presented. As with "On-Us" checks, if these checks are honored, they result in losses to the bank.

Still another category of fraud involving checks is referred to as check kiting. Check kiting is a specialized case of Deposit Fraud that involves presenting a check without sufficient funds to cover the amount of the check. After presenting a first check as a deposit to one account, kiters quickly deposit another check from a second account to cover the first check, creating an opportunity to use float—the gap between when checks are presented and cleared—to their advantage. Kiting can be accidental or intentional, small-scale or very large.

Software that is designed to aid in the detection of fraudulent activities exists. Many of these conventional packages offer rudimentary user interfaces that display unadorned transactional information. Users of these software packages are often forced to review large amounts of this transactional information in search of fraudulent activity. Even so, many business concerns use fraud detection software to identify and stop fraudulent activities, thereby saving themselves and others from significant financial losses.

SUMMARY OF INVENTION

Aspects and examples disclosed herein present fraud detection systems and processes that direct investigation of potentially fraudulent activities in a manner that is more effective and efficient than conventional fraud detection systems and processes. For instance, some examples disclosed herein manifest an appreciation that different categories of fraud involve different schemes and approaches and that each requires analysis and review of different types of data. Many of these examples include a system interface, an analytics engine and a user interface. In these examples, the system interface receives empirical data from a diverse set of sources and stores the data for further processing by the analytics engine. The analytics engine analyzes the empirical data to characterize the likelihood that activities described in the data are fraudulent and generates alerts indicating potentially fraudulent activity. The user interface alters its structure and content based on the characteristics and investigatory needs of the potentially fraudulent activity being reported. As is explained further below, the user interface embodies a high degree of subject matter expertise and provides relevant information often using unconventional user interface components.

The fraud detection systems and processes disclosed herein target a wide variety of potentially fraudulent activity. A non-limiting list of the categories of fraudulent activity that may be investigated using these systems and methods includes deposit account fraud, check fraud, ACH fraud, ATM fraud, debit card fraud, credit card fraud, check kiting, employee fraud, health care fraud, identify theft, mortgage fraud, money laundering, paperhanging, account takeovers, application fraud, bust-out fraud and identify theft. Other categories of fraudulent activities may be addressed according to various examples. Thus, examples are not limited to activities belonging to particular categories or possessing particular attributes.

According to one aspect, a computer implemented method of providing information regarding an activity that is potentially fraudulent is provided. The method includes acts of receiving a fraud alert from an analytics engine, the fraud alert having at least one reason code and alert content, the alert content describing the activity, determining a set of user interface components associated with the at least one reason code and presenting the set of user interface components and the alert content to a user.

In the method, the act of presenting the set of user interface components may include an act of presenting a valid activity that shares a common characteristic with the activity that is potentially fraudulent. In addition, the act of receiving the fraud alert may include an act of receiving at least one reason code indicative of check fraud and the act of presenting the set of user interface components may include an act of presenting a link between representations of checks with periodically re-occurring amounts. Further, the act of receiving the fraud alert may include an act of receiving at least one reason code indicative of check fraud and the act of presenting the set of user interface components may include an act of presenting a representation of variances between a plurality of expected attributes and a plurality of corresponding attributes of checks. Moreover, the act of receiving the fraud alert may include an act of receiving at least one reason code indicative of check fraud and the act of presenting the set of user interface components may include an act of presenting a representation of a check book that characterizes a plurality of serial numbers for checks associated with the check book. Additionally, the act of presenting the representation of the check book may include an act of presenting a representation of a range extending from the representation of the check book, the representation of the range indicating expected serial numbers for checks associated with the check book. Furthermore, the act of receiving at least one reason code indicative of check fraud may include an act of receiving at least one reason code indicative of on-us fraud.

In the method, the act of presenting the set of user interface components may include an act of presenting a representation of past fraud alerts within a timeline control. In addition, the act of receiving the fraud alert may include the act of receiving at least one reason code indicative of deposit fraud and the act of presenting the set of user interface components may include an act of presenting a timeline control spanning a duration specified in the alert content. Further, the act of receiving the fraud alert may include an act of receiving at least one reason code indicative of deposit fraud and the act of presenting the set of user interface components may include an act of presenting a concave hull representation of balances of at least one account over a predetermined period of time. Moreover, the set of user interface components may include a plurality of charts and the act of presenting the set of user interface components may include acts of selecting a preferred chart from the plurality of charts based on the reason code and the alert content and presenting the preferred chart prior to providing access to the other charts of the plurality of charts. Additionally, a combination of the reason code and the alert content may indicate that a serial number of a presented check is outside a range of threshold numbers and the act of selecting the preferred chart may include an act of selecting a multivariate chart that illustrates a variance between the serial number and an expected serial number for the check.

According to another aspect, a system for providing information regarding an activity that is potentially fraudulent is provided. The system includes a fraud alert interface configured to receive a fraud alert from an analytics engine, the fraud alert having at least one reason code and alert content, the alert content describing the activity, an interface engine configured to determine a set of user interface components associated with the at least one reason code and a user interface configured to present the set of user interface components and the alert content to a user.

In the system, the user interface may be further configured to present a valid activity that shares a common characteristic with the activity that is potentially fraudulent. In addition, the fraud alert may include at least one reason code indicative of check fraud and the user interface may be configured to present a link between representations of checks with periodically re-occurring amounts. Further, the fraud alert may include at least one reason code indicative of check fraud and the user interface may be configured to present a representation of variances between a plurality of expected attributes and a plurality of corresponding attributes of checks. Moreover, the fraud alert may include at least one reason code indicative of check fraud and the user interface may be configured to present a representation of a check book that characterizes a plurality of serial numbers for checks associated with the check book. Additionally, the user interface may be configured to present the representation of the check book by presenting a representation of a range extending from the representation of the check book, the representation of the range indicating expected serial numbers for checks associated with the check book. Furthermore, the reason code indicative of check fraud may be indicative of on-us fraud.

In the system, the user interface may be configured to present a representation of past fraud alerts within a timeline control. Further, the fraud alert may include at least one reason code indicative of deposit fraud and the user interface may be configured to present a timeline control spanning a duration specified in the alert content. Moreover, the fraud alert may include at least one reason code indicative of deposit fraud and the user interface may be configured to present a concave hull representation of balances of at least one account over a predetermined time period.

According to another aspect, a non-transitory computer readable medium is provided. The computer readable medium has instructions stored thereon that, when executed by at least one processor, instruct the at least one processor to perform a method of providing information regarding an activity that is potentially fraudulent. The method includes acts of receiving a fraud alert from an analytics engine, the fraud alert having at least one reason code and alert content, the alert content describing the activity, determining a set of user interface components associated with the at least one reason code and presenting the set of user interface components and the alert content to a user. In addition, the instructions for receiving the fraud alert may instruct the at least one processor to perform acts including receiving at least one reason code indicative of check fraud and the instructions for presenting the set of user interface components instruct the at least one processor to perform acts including presenting a representation of variances between a plurality of expected attributes and a plurality of corresponding attributes of checks associated with a check book.

According to another aspect, a system for providing information regarding a suspect activity identified as potentially fraudulent is provided. The system includes a memory storing data describing the suspect activity, the suspect activity including a plurality of attributes, each attribute of the plurality of attributes including an actual value and being associated with an expected value and an interface coupled to the memory and configured to receive an indication of the suspect activity and present a representation of differences between the actual value of, and the expected value associated with, each attribute of the plurality of attributes of the suspect activity.

In the system, the representation of the differences may include a plurality of axes, each axis of the plurality of axes indicating a set of potential values for a difference between the actual value of, and the expected value associated with, one of the plurality of attributes. In addition, the representation of differences may include at least one geometric shape that represents a set of reference values. Further, the at least one geometric shape may include a circle. Moreover, the at least one geometric shape may include a three dimensional shape. Additionally, the memory may further store data describing a plurality of authentic activities including a plurality of authentic attribute values, each of the plurality of authentic activities sharing at least one common characteristic with the suspect activity, the plurality of authentic attribute values having a standard deviation, and the at least one geometric shape may include a plurality of concentric circles, each of the plurality of concentric circles having a center, a circumference and a radius with a distance indicating that a value represented by the center differs from a value represented by any point on the circumference by a multiple of the standard deviation. Furthermore, the interface may be further configured to present a representation of at least one authentic activity that shares a common characteristic with the suspect activity. Also, the data describing the suspect activity may include information describing presentation of a check.

According to another aspect, a computer implemented method for providing information regarding a suspect activity identified as potentially fraudulent is provided. The method includes acts of storing data describing the suspect activity in a memory, the suspect activity including a plurality of attributes, each attribute of the plurality of attributes including an actual value and being associated with an expected value, receiving, via an interface, an indication of the suspect activity and presenting, via the interface, a representation of differences between the actual value of, and the expected value associated with, each attribute of the plurality of attributes of the suspect activity.

In the method, the act of presenting, via the interface, the representation of the differences may include an act of presenting a plurality of axes, each axis of the plurality of axes indicating a set of potential values for a difference between the actual value of, and the expected value associated with, one of the plurality of attributes. In addition, the act of presenting, via the interface, the representation of differences may include an act of presenting at least one geometric shape that represents at least one set of reference values. Further, the act of presenting the at least one geometric shape may include an act of presenting a circle. Moreover, the act of presenting the at least one geometric shape may include an act of presenting a three dimensional shape.

The method may further include an act of storing data describing a plurality of authentic activities including a plurality of authentic attribute values, each of the plurality of authentic activities sharing at least one common characteristic with the suspect activity, the plurality of authentic attribute values having a standard deviation. In addition, the act of presenting the at least one geometric shape may include an act of presenting a plurality of concentric circles, each of the plurality of concentric circles having a center, a circumference and a radius with a distance indicating that a value represented by the center of the circle differs from a value represented by any point on the circumference by a multiple of the standard deviation. Moreover, the method may further include an act of presenting a representation of at least one authentic activity that shares a common characteristic with the suspect activity. Additionally, the act of storing the data describing the suspect activity may include an act of storing information describing presentation of a check.

According to another aspect, a non-transitory computer readable medium is provided. The computer readable medium has instructions stored thereon that, when executed by at least one processor, instruct the at least one processor to perform a method of providing information regarding a suspect activity identified as potentially fraudulent. The method includes acts of storing data describing the suspect activity, the suspect activity including a plurality of attributes, each attribute of the plurality of attributes including an actual value and being associated with an expected value, receiving an indication of the suspect activity and presenting a representation of differences between the actual value of, and the expected value associated with, each attribute of the plurality of attributes of the suspect activity.

The instructions may also instruct the at least one processor to present the representation of the differences by presenting a plurality of axes, each axis of the plurality of axes indicating a set of potential values for a difference between the actual value of, and the expected value associated with, one of the plurality of attributes. In addition, the instructions may instruct the at least one processor to present the representation of differences by presenting at least one geometric shape that represents at least one set of reference values. Moreover, the instructions may instruct the at least one processor to store data describing a plurality of authentic activities including a plurality of authentic attribute values, each of the plurality of authentic activities sharing at least one common characteristic with the suspect activity, the plurality of authentic attribute values having a standard deviation. Further, the instructions may instruct the at least one processor to present the at least one geometric shape by presenting a plurality of concentric circles, each of the plurality of concentric circles having a center, a circumference and a radius with a distance indicating that a value represented by the center of the circle differs from a value represented by any point on the circumference by a multiple of the standard deviation.

According to another aspect, a system for providing information regarding a suspect activity identified as potentially fraudulent is provided. The system includes a memory storing data describing a plurality of valid activities, each valid activity of the plurality of valid activities having a plurality of attributes, each attribute of each plurality of attributes having a value and an interface coupled to the memory and configured to receive an indication of the suspect activity, present a representation of the suspect activity, present a plurality of representations of valid activities that share at least one common characteristic with the suspect activity and present a link between a first representation of the plurality of representations and second representation of the plurality of representations. The first representation represents a first valid activity including at least one first attribute having a quasi-periodically re-occurring value and the second representation represents a second valid activity including at least one second attribute having the quasi-periodically re-occurring value.

In the system, the suspect activity may include presentation of a check. In addition, the link may include a line between the first representation and the second representation. Further, the first representation and the second representation each may have a shape that is different from other representations of the plurality of representations and the representation of the suspect activity. Moreover, the first representation and the second representation may be de-emphasized relative to the other representations and the representation of the suspect activity. Additionally, the interface may be further configured to present a plurality of axes, each axis of the plurality of axes indicating a set of potential values of an attribute of the suspect activity. Furthermore, the suspect activity may include presentation of a check, the check having an amount and a date of presentation and the plurality of axes may include a first axis and a second axis, the first axis indicating a set of potential values for the date of presentation and the second axis indicating a set of potential values for the amount.

According to another aspect, a computer implemented method for providing information regarding a suspect activity identified as potentially fraudulent is provided. The method includes acts of storing data describing a plurality of valid activities in a memory, each valid activity of the plurality of valid activities having a plurality of attributes, each attribute of each plurality of attributes having a value, receiving, via an interface, an indication of the suspect activity, presenting, via the interface, a representation of the suspect activity, presenting, via the interface, a plurality of representations of valid activities that share at least one common characteristic with the suspect activity and presenting, via the interface, a link between a first representation of the plurality of representations and second representation of the plurality of representations. The first representation represents a first valid activity including at least one first attribute having a quasi-periodically re-occurring value and the second representation represents a second valid activity including at least one second attribute having the quasi-periodically re-occurring value.

In the method, the act of receiving, via the interface, the indication of the suspect activity may include an act of receiving an indication of a presentation of a check. In addition, the act of presenting, via the interface, the link may include an act of presenting a line between the first representation and the second representation. Further, the act of presenting, via the interface, a plurality of representations may include an act of presenting the first representation and the second representation with a shape that is different from other representations of the plurality of representations and the representation of the suspect activity. Moreover, the act of presenting the first representation and the second representation may include an act of presenting the first representation and the second representation as de-emphasized relative to the other representations and the representation of the suspect activity. Additionally, the method may further include an act of presenting a plurality of axes, each axis of the plurality of axes indicating a set of potential values of an attribute of the suspect activity. Furthermore, the act of receiving, via the interface, the indication of the suspect activity may include an act of receiving an indication of a presentation of a check, the check having an amount and a date of presentation and the act of presenting the plurality of axes may include an act of presenting a first axis and a second axis, the first axis indicating a set of potential values for the date of presentation and the second axis indicating a set of potential values for the amount.

According to another aspect, a non-transitory computer readable medium is provided. The computer readable medium has instructions stored thereon that, when executed by at least one processor, instruct the at least one processor to perform a method of providing information regarding a suspect activity identified as potentially fraudulent. The method includes acts of storing data describing a plurality of valid activities, each valid activity of the plurality of valid activities having a plurality of attributes, each attribute of each plurality of attributes having a value, receiving an indication of the suspect activity, presenting a representation of the suspect activity, presenting a plurality of representations of valid activities that share at least one common characteristic with the suspect activity and presenting a link between a first representation of the plurality of representations and second representation of the plurality of representations. The first representation represents a first valid activity including at least one first attribute having a quasi-periodically re-occurring value and the second representation represents a second valid activity including at least one second attribute having the quasi-periodically re-occurring value.

The instructions may also instruct the at least one processor to receive the indication of the suspect activity by receiving an indication of a presentation of a check. In addition, the instructions may instruct the at least one processor to present the link by presenting a line between the first representation and the second representation. Further, the instructions may instruct the at least one processor to present a plurality of representations by presenting the first representation and the second representation with a shape that is different from other representations of the plurality of representations and the representation of the suspect activity. Moreover, the instructions may instruct the at least one processor to present the first representation and the second representation by presenting the first representation and the second representation as de-emphasized relative to the other representations and the representation of the suspect activity. Additionally, the instructions may further instruct the at least one processor to perform acts including presenting a plurality of axes, each axis of the plurality of axes indicating a set of potential values of an attribute of the suspect activity.

According to another aspect, a system for providing information regarding a suspect check that is potentially fraudulent is provided. The system includes a memory storing data describing a check book associated with plurality of checks, the plurality of checks including the suspect check and a plurality of authentic checks, each check of the plurality of checks including a plurality of attributes, each attribute of each plurality of attributes having an actual value and an interface coupled to the memory and configured to receive an indication of the suspect check, present a representation of the suspect check, present a representation of the check book and present a representation of a zone extending from the representation of the check book, the representation of the zone indicating a plurality of reference values for at least one of the plurality of attributes of the suspect check.

In the system, the at least one of the plurality of attributes may include a serial number. In addition, the interface may be further configured to present a representation of at least one authentic check of the plurality of authentic checks. Further, the representation of the check book may include a first curve. Moreover, the representation of the zone may include a second curve indicating an upper bound of the plurality of reference values and a third curve indicating a lower bound of the plurality of reference values. Additionally, a subset of the actual values of the plurality of authentic checks has a standard deviation and the second curve and the third curve are each disposed at a distance from the first curve, the distance indicating that values represented by points on either the second curve or the third curve differ from values represented by points on the first curve by a multiple of the standard deviation. Furthermore, the interface may be further configured to present a plurality of axes, each axis of the plurality of axes indicating a set of potential values of an attribute of the suspect check. Also, the representation of the zone may include a three dimensional shape that represents the plurality of reference values.

According to another aspect, a computer implemented method for providing information regarding a suspect check that is potentially fraudulent is provided. The method includes acts of storing, in a memory, data describing a check book associated with plurality of checks, the plurality of checks including the suspect check and a plurality of authentic checks, each check of the plurality of checks including a plurality of attributes, each attribute of each plurality of attributes having an actual value, receiving, via an interface, an indication of the suspect check, presenting, via the interface, a representation of the suspect check, presenting, via the interface, a representation of the check book and presenting, via the interface, a representation of a zone extending from the representation of the check book. The representation of the zone may indicate a plurality of reference values for at least one of the plurality of attributes of the checks of the plurality of checks associated with the check book.

In the method, the act of presenting, via the interface, the representation of the zone may include an act of presenting a representation of a zone indicating a plurality of reference values for serial numbers of the checks associated with the check book. In addition, the method may further include an act of presenting a representation of at least one authentic check of the plurality of authentic checks. Further, the act of presenting, via the interface, the representation of the check book may include an act of presenting a first curve. Moreover, the act of presenting, via the interface, the representation of the zone may include an act of presenting a second curve indicating an upper bound of the plurality of reference values and a third curve indicating a lower bound of the plurality of reference values. Additionally, a subset of the actual values of the plurality of authentic checks may have a standard deviation and the act of presenting, via the interface, the representation of the zone may include an act of presenting the second curve and the third curve at a distance from the first curve, the distance indicating that values represented by points on either the second curve or the third curve differ from values represented by points on the first curve by a multiple of the standard deviation. Furthermore, the method may further include an act of presenting a plurality of axes, each axis of the plurality of axes indicating a set of potential values of an attribute of the suspect check. Also, the act of presenting, via the interface, the representation of the zone may include an act of presenting a three dimensional shape that represents the plurality of reference values.

According to another aspect a non-transitory computer readable medium is provided. The computer readable medium has instructions stored thereon that, when executed by at least one processor, instruct the at least one processor to perform a method of providing information regarding a suspect activity identified as potentially fraudulent. The method includes acts of storing data describing a check book associated with plurality of checks, the plurality of checks including the suspect check, each check of the plurality of checks including a plurality of attributes, each attribute of each plurality of attributes having an actual value, receiving an indication of the suspect check, presenting a representation of the suspect check, presenting a representation of the check book and presenting a representation of a zone extending from the representation of the check book. The representation of the zone may indicate a plurality of reference values for at least one of the plurality of attributes of the checks of the plurality of checks associated with the check book.

The instructions may also instruct the at least one processor to present the representation of the zone by presenting a representation of a zone indicating a plurality of reference values for serial numbers of the checks associated with the check book. In addition, the instructions may further instruct the at least one processor to perform acts including presenting a representation of at least one authentic check of the plurality of authentic checks. Moreover, the instructions may instruct the at least one processor to present the representation of the check book by presenting a curve.

According to another aspect, a system for providing information regarding a suspect activity identified as potentially fraudulent is provided. The system includes a memory storing activity data describing the suspect activity, the suspect activity being associated with an account and account data describing at least one balance metric for the account. The system also includes an interface coupled to the memory and configured to receive an indication of the suspect activity, present a representation of the suspect activity, present a representation of the at least one balance metric and present a representation of a timeline that includes an indication of any previous activity identified as potentially fraudulent and associated with the account.

In the system the representation of the at least one balance metric may include a curve and a lower concave hull between local minimums of the curve. In addition, the at least one balance metric may include a ledger balance, an available balance and a collected balance. Further, the representation of the at least one balance metric may highlight differences between the ledger balance, the available balance and the collected balance. Moreover, the indication of any previous activity identified as potentially fraudulent may include a time period and the representation of the timeline may span the time period. Additionally, the time period may extend beyond a time associated with the suspect activity and a time associated any previous activity identified as potentially fraudulent. Furthermore, the interface may be further configured to receive an adjustment of the time period via the representation of the timeline.

According to another aspect, a computer implemented method for providing information regarding a suspect activity that is potentially fraudulent is provided. The method includes acts of storing, in a memory, activity data describing the suspect activity, the suspect activity being associated with an account, storing, in the memory, account data describing at least one balance metric for the account, receiving, via an interface, an indication of the suspect activity, presenting, via the interface, a representation of the suspect activity, presenting, via the interface, a representation of the at least one balance metric and presenting, via the interface, a representation of a timeline that includes an indication of any previous activity identified as potentially fraudulent and associated with the account.

In the method, the act of presenting, via the interface, the representation of the at least one balance metric may include an act of presenting a curve and a lower concave hull between local minimums of the curve. In addition, the act of presenting, via the interface, the representation of the at least one balance metric may include an act of presenting a ledger balance, an available balance and a collected balance. Further, the act of presenting the ledger balance, the available balance and the collected balance may include an act of highlighting differences between the ledger balance, the available balance and the collected balance. Moreover, the act of presenting, via the interface, the representation of the timeline may include an act of presenting a timeline that spans a time period associated with any previous activity identified as potentially fraudulent. Additionally, the act of presenting the timeline that spans the time period may include an act of presenting a timeline that extends beyond a time associated with the suspect activity and a time associated with any previous activity that is suspected of being fraudulent. Furthermore, the method may further include acts of receiving a request to adjust the time period from a user and adjusting, responsive to the request, the time period.

According to another aspect, a non-transitory computer readable medium is provided. The computer readable medium has instructions stored thereon that, when executed by at least one processor, instruct the at least one processor to perform a method of providing information regarding a suspect activity that is potentially fraudulent. The method includes acts of storing activity data describing the suspect activity, the suspect activity being associated with an account, storing account data describing at least one balance metric for the account, receiving an indication of the suspect activity, presenting a representation of the suspect activity, presenting a representation of the at least one balance metric and presenting a representation of a timeline that includes an indication of any previous activity identified as potentially fraudulent and associated with the account.

The instructions may also instruct the at least one processor to present the representation of the at least one balance metric by presenting a curve and a lower concave hull between local minimums of the curve. In addition, the instructions may instruct the at least one processor to receive the indication by receiving an indication including a time period and the instructions instruct the at least one processor to present the representation of the timeline by presenting a timeline that spans the time period. Further, the instructions may instruct the at least one processor to present the representation of the at least one balance metric by presenting a ledger balance, an available balance and a collected balance. Moreover, the instructions may instruct the at least one processor to present the ledger balance, the available balance and the collected balance with highlighted differences between the ledger balance, the available balance and the collected balance.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example. In addition, it is to be appreciated that activities deemed as potentially fraudulent, or the instruments or items used to conduct these potentially fraudulent activities, may be referred to herein as "suspect" and activities deemed non-fraudulent, and any instruments or items associated therewith, may be referred to herein as "valid," "genuine" or "authentic."

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Aspects and examples disclosed herein relate to apparatus and processes for receiving an indication of potentially fraudulent activity and generating a presentation of fraud detection information suitable for the category of fraud indicated. For instance, processes and apparatus in accord with some examples receive fraud alerts that include one or more reason codes and one or more portions of alert content. Alert content includes particular instances of potentially fraudulent activity and information that is pertinent to, and associated with, these instances. Reason codes indicate characteristics associated with the activity that provide the basis for classifying the activity as potentially fraudulent. For example, a reason code may indicate that a particular transaction was drawn on an account that was opened in a branch known to have a higher risk of fraudulent activity or that the particular transaction was drawn to an account with a history of fraudulent activity.

Additionally, in some examples, alerts include a primary reason code and one or more secondary reason codes. In these examples, the primary reason code may indicate a characteristic of the potentially fraudulent activity that is relatively more anomalous than other, irregular characteristics of the transaction. For instance, a transaction may be drawn to an account that was opened recently and that includes a serial number of a check that has already cleared the account. In this instance, the primary reason code may indicate that the transaction includes a duplicate check serial number and the secondary reason code may indicate that the transaction was drawn to a recently opened account. In other examples, the primary reason code may indicate an activity that would not be considered anomalous but for the combination of the primary reason code with secondary reason code(s). For instance, a transaction may be drawn for an amount above a threshold value that is applicable only to new accounts. In this instance, the primary reason code may indicate that the transaction amount exceeded a threshold associated only with new accounts and the secondary reason code may indicate that the check was drawn on a recently opened account.

According to some examples, alerts that share one or more common characteristics are organized into queues. These queues may be used to manage the workflow of analysts who investigate the authenticity of potentially fraudulent activity. For instance, in some examples, an analyst may be assigned to work alerts that are associated with a particular queue. In this situation, the analyst retrieves, reviews and eventually disposes of alerts that reside within her assigned queue.

Figure 13:
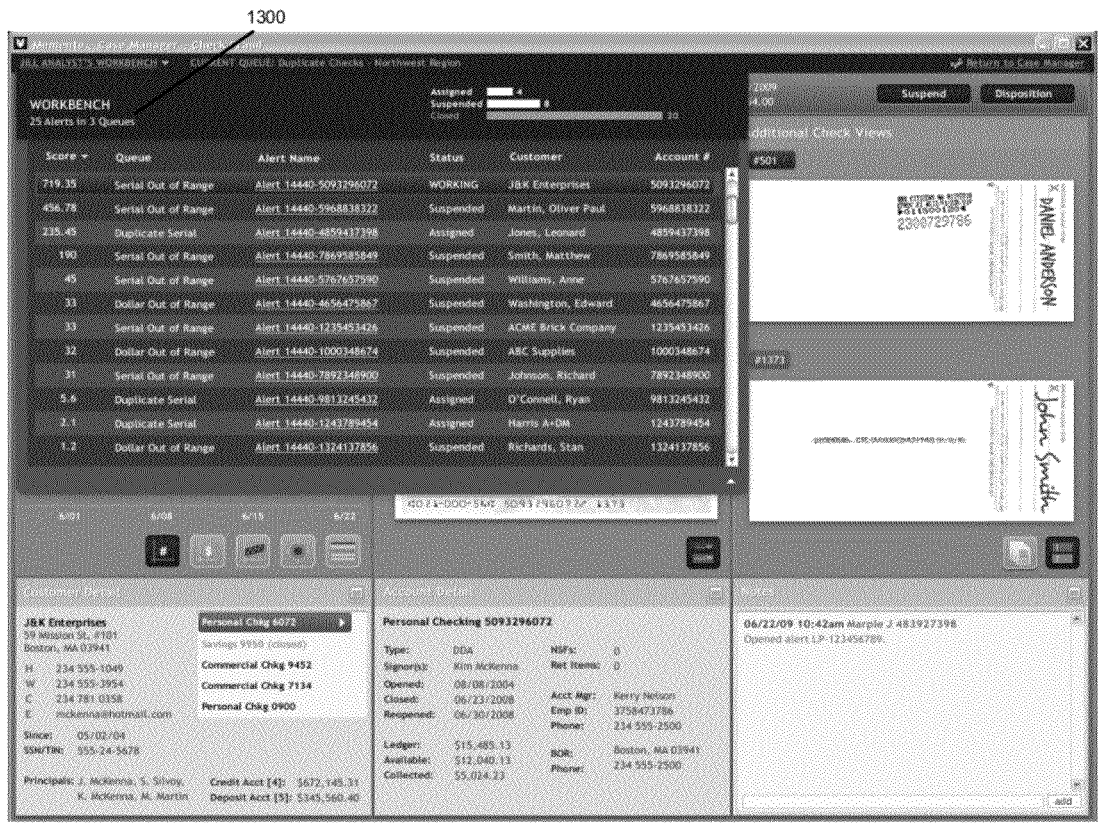
FIG. 13 is another exemplary illustration of a fraud alert driven user interface.

In various examples, a variety of common characteristics of alerts are used to associate the alerts with one or more queues. In some of these examples, the queue with which an alert is associated is determined, at least in part, by a reason code included in the alert. For instance, in such one example, the set of queues includes a duplicate queue, a deposit queue, a kiting queue, an out-of-pattern queue and a multiqueue for alerts that include a plurality of reason codes. Another example includes parameters that enable customization of alert to queue associations. In this instance, one or more parameters may specify that a particular queue be associated, for example, with alerts having a reason code indicative of potentially fraudulent deposit activity and that originate from activity involving branches located within a particular geographic area, such as the southeast or mid-atlantic. FIG. 13 illustrates a user interface that includes a component 1300, referred to as a "Workbench," that displays a plurality of alerts their associated queues.

In other examples, components within a fraud detection interface select a set of user interface components for presentation to a user based upon the category of fraud indicated by an alert. In these examples, the user interface components selected by the fraud detection interface may include representations of individual checks, representations of quasi-periodically re-occurring checks, representations of check books, representations of financial institution exposure over time and representations of the probability that presented checks are authentic considering a plurality of check characteristics. As used herein, the term "quasi-periodic" is used to denote activity attributes that follow a substantially regular pattern. For instance, checks used to pay monthly rent are likely to be associated within a quasi-periodic group. This is so because rent checks have several quasi-periodic attributes, i.e. similar (or the same) amounts, are presented at substantially the same time each month and are often presented by the same person or business entity.

In one example where the fraud detection user interface receives a reason code directed generally toward check fraud, the fraud detection user interface selects and displays a set of user interface components that focus on attributes of individual checks. These attributes may include the specific account against which the checks are drawn, serial numbers of the checks, dates of presentment of the checks, check amounts, the identity of the endorser and patterns involving these attributes. In another example where the fraud detection user interface receives a reason code directed to deposit fraud in general, the fraud detection user interface selects and presents a set of user interface components that focus on attributes of the overall account. These attributes may include account balances, daily transaction totals and the like.

Figure 6:
FIG. 6 is another exemplary illustration of a fraud alert driven user interface.

In addition, some of these examples assist the user in analyzing the alert by emphasizing a particular subset of the selected user interface components as a function of one or more reason codes included in the alert. For instance, in some situations, the reason code may indicate the presentment of a check with a serial number that is a duplicate of a serial number of a previously presented check. Such checks are likely to be fraudulent. In these situations, the fraud detection user interface may emphasize the "Serial×Order Presented" component by displaying the "Serial×Order Presented" component prior to displaying other selected user interface. The "Serial×Order Presented" component, which is discussed further below with regard to FIG. 6, is selected and presented because it allows the analyst to easily determine which check with the duplicate serial number better fits the overall transaction history. In another example, reason codes may indicate that a check has a plurality of characteristics that, when analyzed as a whole, indicate that the check is an outlier to an established pattern. In this instance, the fraud detection user interface emphasizes a component that illustrates the anomalous nature of the check such as the "Dollar Variance×Serial Variance" component discussed below with regard to FIG. 9.

Thus examples disclosed herein select and display user interface components that are relevant to the category of potentially fraudulent activity being reported. In addition, examples disclosed herein emphasize the specific subsets of the selected user interface components that are most useful in analyzing the potentially fraudulent activity. These and additional characteristics of the fraud detection user interface are discussed further below.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Fraud Alert Driven User Interface

Figure 1:
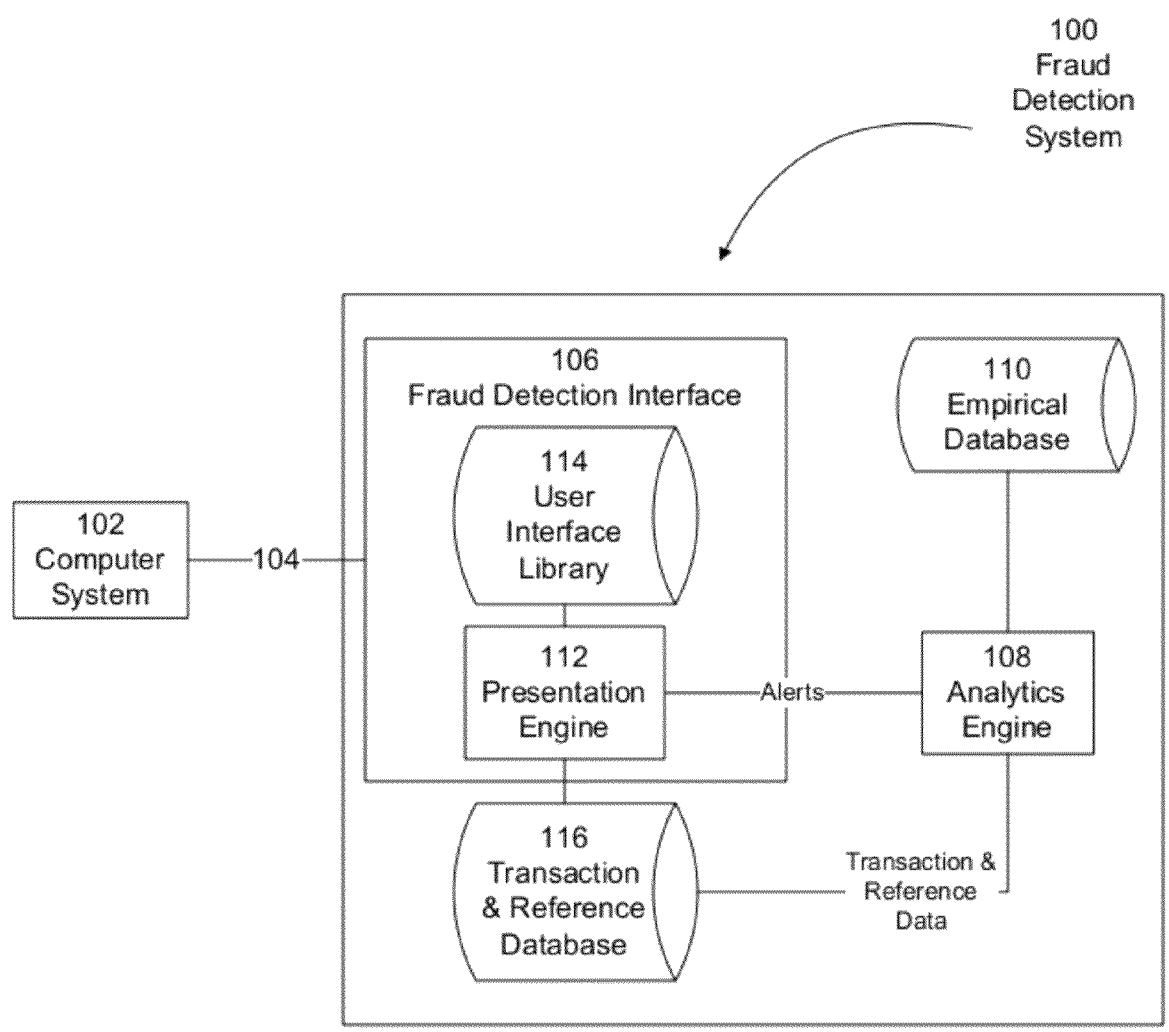
FIG. 1 is a block diagram of one example of a fraud detection system within a network.

Various examples disclosed herein effect a fraud alert driven user interface on one or more computer systems. As is explained further below, examples of a fraud alert driven user interface harness the reasons that triggered the fraud alert and the content included in the fraud alert to identify one or more user interface components that display information in a manner that aids analysis and investigation of potentially fraudulent activity. In these examples, after identifying the interface components, the fraud alert driven user interface displays the fraud alert content within a user interface including the identified components. FIG. 1 illustrates an example including a fraud alert driven user interface.

FIG. 1 includes a fraud detection system 100 coupled to a computer system 102 via a network 104. According to various examples, the fraud detection system 100 is implemented using one or more computer systems, such as the distributed computer system 300 discussed below with regard to FIG. 3. Thus, examples of the fraud detection system 100 include a variety of hardware and software components configured to perform the functions described herein and examples are not limited to a particular hardware component, software component or particular combination thereof. The network 104 may include any communication network through which computer systems may exchange (i.e. send or receive) information. For example, the network 104 may be a public network, such as the internet, and may include other public or private networks such as LANs, WANs, extranets and intranets. As shown, the computer system 102 is coupled to, and can exchange data with, the fraud detection system 100 via the network 104.

In addition, information may flow between the elements, components and subsystems described herein using a variety of techniques. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

In the illustrated example, the fraud detection system 100 includes a fraud detection interface 106, an analytics engine 108, an empirical database 110 and a transaction and reference database 116. As discussed further below, the empirical database 110 includes a variety of factual information regarding fraudulent and non-fraudulent activities conducted by various entities. The analytics engine 108 analyzes the factual information using a number of advanced mathematical techniques and ranks activities according to their risk of being fraudulent. Activities determined to have a low risk are deemed authentic and activities having a high risk are deemed potentially fraudulent. Upon identifying potentially fraudulent activity, the analytics engine 108 generates and issues a fraud alert to the fraud detection interface 106 and provides transaction and reference records that correspond to the fraud alert to the transaction and reference database 116.

In the example shown, the fraud detection interface 106 includes a presentation engine 112 and a user interface library 114. The user interface library 114 includes a plurality of user interface components that are specially configured for display in conjunction with content included in fraud alerts. As with other components of the system, these specialized user interface components may include data structures and executable instructions. In addition, the user interface library 114 provides a system interface through which other system components, such as the presentation engine 112, can request instantiation of the components housed within the library. Some examples of the visualizations created by these user interface components are discussed further below with regard to FIGS. 4-13.

According to the example illustrated in FIG. 1, the fraud detection interface 106 resides on the fraud detection system 100. However, as explained with regard to FIG. 3 below, other examples may arrange system components in a variety of configurations. For instance, in some examples, the fraud detection interface 106 resides on at least one client system, such as computer system 102.

The empirical database 110 depicted in FIG. 1 includes components that store and retrieve empirical data. In general, this empirical may include any information associated with any activity conducted by entities that may be characterized as fraudulent or authentic. The data included in the empirical database 110 may be gathered from a wide variety of sources. For instance, in an example directed toward check fraud, the systems from which data is imported include financial software systems, payroll systems, and customer relationship management systems. In these examples, the information imported includes account information, customer information, branch information, employee information and financial transaction information. In addition, the empirical database 110 may include an audit trail detailing the date and time of any changes made to the data contained within.

The transaction and reference database 116 depicted in FIG. 1 includes components that store and retrieve transaction and reference information. In general, this transaction and reference information may include any information associated with a fraud alert. In many examples, transaction and reference information provides additional detail regarding the empirical data that triggered the fraud alert. This information may include transactional information such as transaction amount, transaction date and time and the identity of the person conducting the transaction, as well as indications of the reference information associated with the transaction. This reference information may include account information, branch information, customer information, and relationships between accounts, customers and branches.

Together, the empirical database 110 and the transaction and reference database 116 define, or may be used to define, a wide variety of attributes and attribute values for fraudulent and non-fraudulent activities. Examples of activity attributes may include any of the types of data discussed above with regard to the empirical database 110 or the transaction and reference database 116, such as customer information, account information or transactional information. In some examples, activity attributes and attribute values also include metrics, summaries or other calculated characterizations of underlying data. Examples of such calculated characterizations include membership of a check in a quasi-periodic group or association of a check with a particular checkbook. Also, in some examples, activity attributes (and attribute values) may describe not only accounts, checks or customers directly involved with the activity but may also indicate items or entities indirectly associated with suspect activity. For instance, attributes of a potentially fraudulent activity may include indications of customers, accounts or items that are not directly involved in a suspect transaction.

Conversely, in some examples, activity attributes include indications of one or more accounts that the analytics engine 108 determines to be intimately involved with a suspect account. In these examples, intimate accounts include two or more accounts that are strongly associated with one another. These associations may be based on a number of account attributes. For instance, accounts may be deemed intimate if the accounts are jointly owned, share the same phone number or address, are referenced in a high number of transactions involving one another or are referenced in transactions that move large percentages of balances between the accounts. Intimate accounts may be held at a single financial institution or may be held at multiple financial institutions.

Information, including empirical data and transaction and reference data, may be stored on the fraud detection system 100 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Continuing the example shown in FIG. 1, the presentation engine 112 processes fraud alerts received from the analytics engine 108. According to some examples, the presentation engine 112 includes components that enable the user to interact with the user interface. These interactive components may include the specially configured user interface components discussed herein or may include other user interface components. In at least one example, these interactive components allow a user to navigate the various components that make up a user interface, such as different controls, frames and screens. The particular makeup of user interfaces presented by the presentation engine is discussed further below with regards to the FIG. 4-13.

In some examples, the presentation engine 112 determines and presents attributes of a user interface that are appropriate for efficient analysis of potentially fraudulent activity. For instance, in at least one example, the presentation engine 112 tailors the timescale according to the reason codes and alert content included in a fraud alert. According to this example, the reason codes may indicate that a third party has potentially taken over a deposit account. In this instance, the alert content may indicate a particular period of time (for example, 3 days) during which customer information (such as address and email information) was altered and an unusual transaction was conducted. In this instance, the presentation engine 112 may display a user interface in accord with FIG. 5, which is described further below. Within this context, the presentation engine 112 may display a detailed view of all account activity conducted within, or substantially near, the particular period of time indicated within the alert content. In addition, the presentation engine 112 may further include representations for the changes to the customer information in the form of gridlines such as gridline 1100 shown in FIG. 11.

According to another example, the reason codes may indicate potential check kiting fraud. In this instance the presentation engine 112 may display a user interface in accord with FIG. 10 which is described further below. Within this context, the presentation engine 112 may display cyclical amount transfers between intimate source and destination accounts within a relatively short period of time (for example, 1-2 weeks). However, if the reason codes indicate potential check kiting fraud based primarily on previous kiting fraud alerts, the presentation engine 112 may display a user interface in accord with FIG. 10 that spans a significantly longer period of time (for example, 6-12 months). This longer time horizon enables users to analyze the complete set of potentially fraudulent activities that triggered the fraud alert.

In this way, the presentation engine 112 provides the user with the information necessary to take corrective action that is appropriate given the risk presented. For example, if the user determines an account has been taken over by a third party, the user may close the account. However, if the user determines that the activity presented as potential check kiting by the presentation engine 112 is actually nothing more than loose account management, the user may adjust the hold period or overdraft policy for the account.

Figure 7:
FIG. 7 is another exemplary illustration of a fraud alert driven user interface.
Figure 8:
FIG. 8 is another exemplary illustration of a fraud alert driven user interface.
Figure 9:
FIG. 9 is another exemplary illustration of a fraud alert driven user interface.

According to some examples, the presentation engine 112 determines the default view presented to a user based on the strength of an association between the potentially fraudulent item and one or more comparable items. Within user interfaces displayed according to this example, the presentation engine 112 presents items that the analytics engine 108 deems as authentic as comparable items to provide a user with adequate context in which to analyze the authenticity of the potentially fraudulent item. Some of these examples are discussed below with regard to FIGS. 5-9. In these examples, the presentation engine 112 selects these comparable items based on a variety of criteria. For instance, according to some examples, the presentation engine 112 presents, as comparable items, checks that belong to the same check book along with the potentially fraudulent check. FIGS. 6 and 7, which are discussed further below, illustrate two such examples. If, however, the check book to which the potentially fraudulent item belongs cannot be determined, the presentation engine 112 presents, as comparable items, checks that belong to a series of checks having a quasi-periodically re-occurring amount. FIG. 8, which is also discussed further below, illustrates one such example. Further, according to some examples, if neither a check book, nor quasi-periodic series can be determined for the potentially fraudulent item, the presentation engine 112 presents the potentially fraudulent item within a display that characterizes the multivariate distance between the potentially fraudulent item and the values expected for the item's serial number and amount. FIG. 9, described further below, illustrate one example of such a user interface.

In some examples, the presentation engine 112 may alter the default view presented based on the existence of a configuration parameter defining particular default views. In other examples, the presentation engine 112 may alter the default view presented based on the strength of an association between the potentially fraudulent item and one or more comparable items. For instance, if the association between the potentially fraudulent item and the series of quasi-periodic checks transgresses a predetermine threshold, the presentation engine 112 displays a user interface in accord with FIG. 9, rather than a user interface in accord with FIG. 6, 7 or 8. Also, according to another example, if the reason codes and alert content indicate that the potentially fraudulent nature of the item is significantly more evidence when comparing multiple characteristics of the potentially fraudulent item to their expected values, rather than when comparing individual characteristics, the presentation engine 112 displays a user interface in accord with FIG. 9.

Presentation Processes

Figure 2:
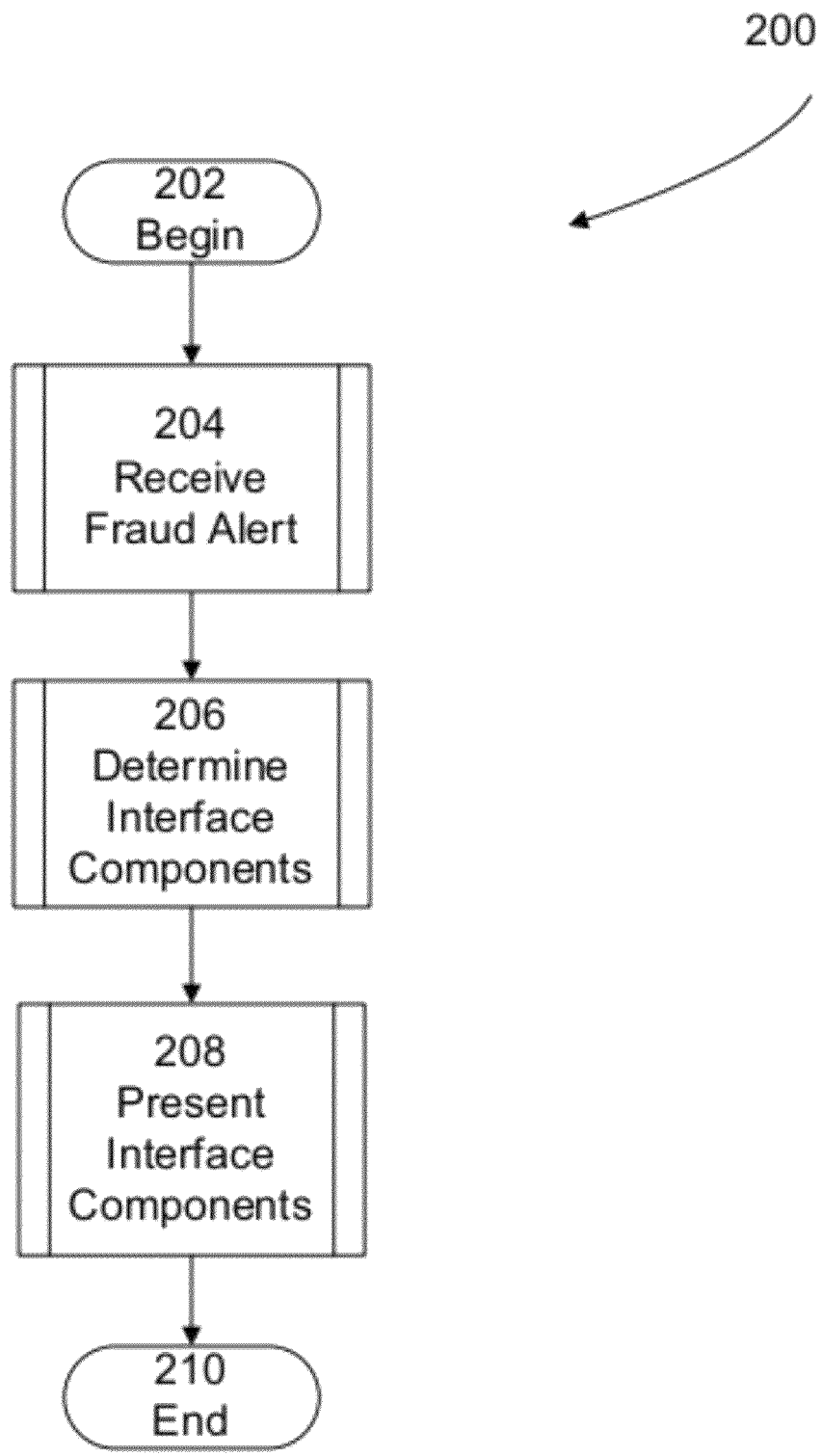
FIG. 2 is a flow diagram of a method for presenting a fraud alert driven user interface.

An example of the method implemented by the presentation engine 112 is illustrated in FIG. 2. In this example, the process 200 includes acts of receiving a fraud alert, determining which user interface components best suit the reason codes included in the fraud alert and presenting a user interface including the user interface components, fraud alert content and transaction and reference information. Process 200 begins at 202.

In act 204, a fraud alert is received from the analytics engine 108. According to various examples, the presentation engine 112 receives the fraud alert via a system interface provided by the presentation engine 112. Upon receipt of the fraud alert, the presentation engine 112 parses one or more reason codes and additional alert content from the fraud alert and stores each in memory for subsequent processing. In some examples, the reason codes are categorized into fraud categories that indicate one or more categories of potentially fraudulent activity. In one example directed toward check fraud, these fraud categories include on-us fraud and deposit fraud. In this example, reason codes belonging to the check fraud category include reasons codes that indicate activity involving on-us fraud, duplicate checks, checks with suspicious amounts, checks written on suspect accounts and checks with characteristics that fall outside established patterns. Also, in this example, reason codes belonging to the deposit fraud category include reason codes that indicate activity involving deposits with characteristics that fall outside an established pattern, transactions conducted in suspect locations, accounts causing the financial institution to suffer increased exposure, accounts exhibiting an increasing negative balance collected, accounts with a large amount of activity given the length of time they have been open, accounts associated with large payments, accounts associated with a new branch, accounts with previously returned checks, accounts exhibiting an increase in the rate of returned checks, accounts associated with previous alerts and account with an unusual exposure.

In act 206, one or more user interface components are identified that are suitable to display alert content given the one or more reason codes parsed from the fraud alert. In some examples, the presentation engine 112 consults an associative data structure that associates reason codes with particular user interface components and issues requests to the user interface library 114 to instantiate user interface components associated with the one or more reason codes. In an example directed toward check fraud, the user interface components that are associated with reason codes belonging to the check fraud category include representations of individual checks, representations of checks with quasi-periodically re-occurring amounts, representations of check books and representations of the probability that presented checks are authentic considering a plurality of check characteristics. According to this example, the user interface components that are associated with reason codes belonging to the deposit fraud category include representations of various account balances, representations of financial institution exposure over time and specialized time line controls that present the history of particular accounts.

In act 208, a user interface is presented to a user that includes the user interface components and alert content. In some examples, the presentation engine 112 also presents information from the transaction and reference database 116 within the user interface. In these examples, the presentation engine 112 requests transaction and reference information associated with the fraud alert from the transaction and reference database 116. In at least one example, the presentation engine 112 requests some types of transaction and reference information as a function of the category of potentially fraudulent activity being reported. For instance, in an example where the reason code indicates potential check kiting, the presentation engine 112 requests account balance information for the suspect account, standard transaction and reference information, such as account and customer information and optional transaction and reference information, such information regarding foreign accounts that are intimately involved with suspect account. In this example, the presentation engine 112 requests the standard information in response to receiving an alert and requests the optional information in response to the presence, within the alert, of the reason code that indicates potential check kiting.

After the presentation engine 112 receives the requested information, the presentation engine 112 presents this information along with the user interface components. Depending on the nature of the each user interface component, the alert content and transaction and reference information may be presented within the user interface component, adjacent to the user interface component or simply in association with the user interface component. Particular examples of these specially configured user interface components are discussed below with reference to FIGS. 4-13.

Process 200 ends at 210. Data driven fraud interface activities in accord with process 200 enable a system to present user interfaces that are structured to display information that is particularly pertinent to the potentially fraudulent activity under investigation. In this way, processes in accord with process 200 provide users with guidance to effectively and efficiently dispose of fraud alerts raised by the system.

Process 200 depicts one particular sequence of acts in a particular example. The acts included in process 200 may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

Computer System

As discussed above with regard to FIG. 1, various aspects and functions may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
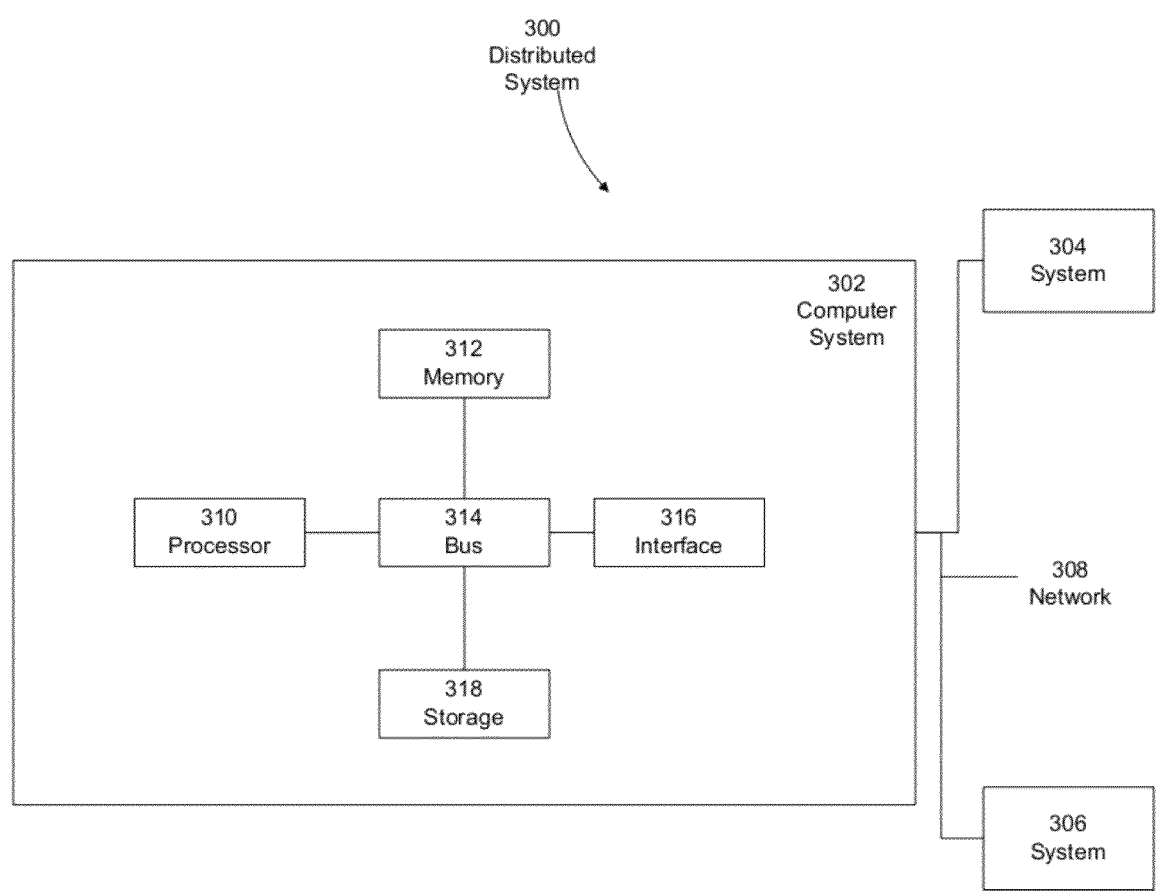
FIG. 3 is a block diagram of one example of a computer system that may be used to perform processes and functions disclosed herein.

Referring to FIG. 3, there is illustrated a block diagram of a distributed computer system 300, in which various aspects and functions may be practiced. The distributed computer system 300 may include one more computer systems that exchange (i.e. send or receive) information. For example, as illustrated, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TSL, SSL or VPN. While the distributed computer system 300 illustrates three networked computer systems, the distributed computer system 300 is not so limited and may include any number of computer systems and computing devices, networked using any medium and communication protocol.

FIG. 3 illustrates a particular example of a distributed computer system 300 that includes computer system 302, 304 and 306. As illustrated in FIG. 3, the computer system 302 includes a processor 310, a memory 312, a bus 314, an interface 316 and data storage 318. The processor 310 may perform a series of instructions that result in manipulated data. The processor 310 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 310 is connected to other system components, including one or more memory devices 312, by the bus 314.

The memory 312 may be used for storing programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein and these data structures may be tailored to store values for particular types of data.

Components of the computer system 302 may be coupled by an interconnection element such as the bus 314. The bus 314 may include one or more physical busses, for example, busses between components that are integrated within a same machine, but may include any communication coupling between system elements including specialized or standard computing bus technologies, such as IDE, SCSI, PCI and InfiniBand. Thus, the bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and communicate with external entities, such as users and other systems.

The data storage 318 may include a computer readable and writeable nonvolatile (non-transitory) data storage medium in which instructions are stored that define a program or other object that may be executed by the processor 310. The data storage 318 also may include information that is recorded, on or in, the medium, and this information may be processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller may cause data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 may manipulate the data within the memory 312, and then copy the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Exemplary User Interfaces

Figure 4:
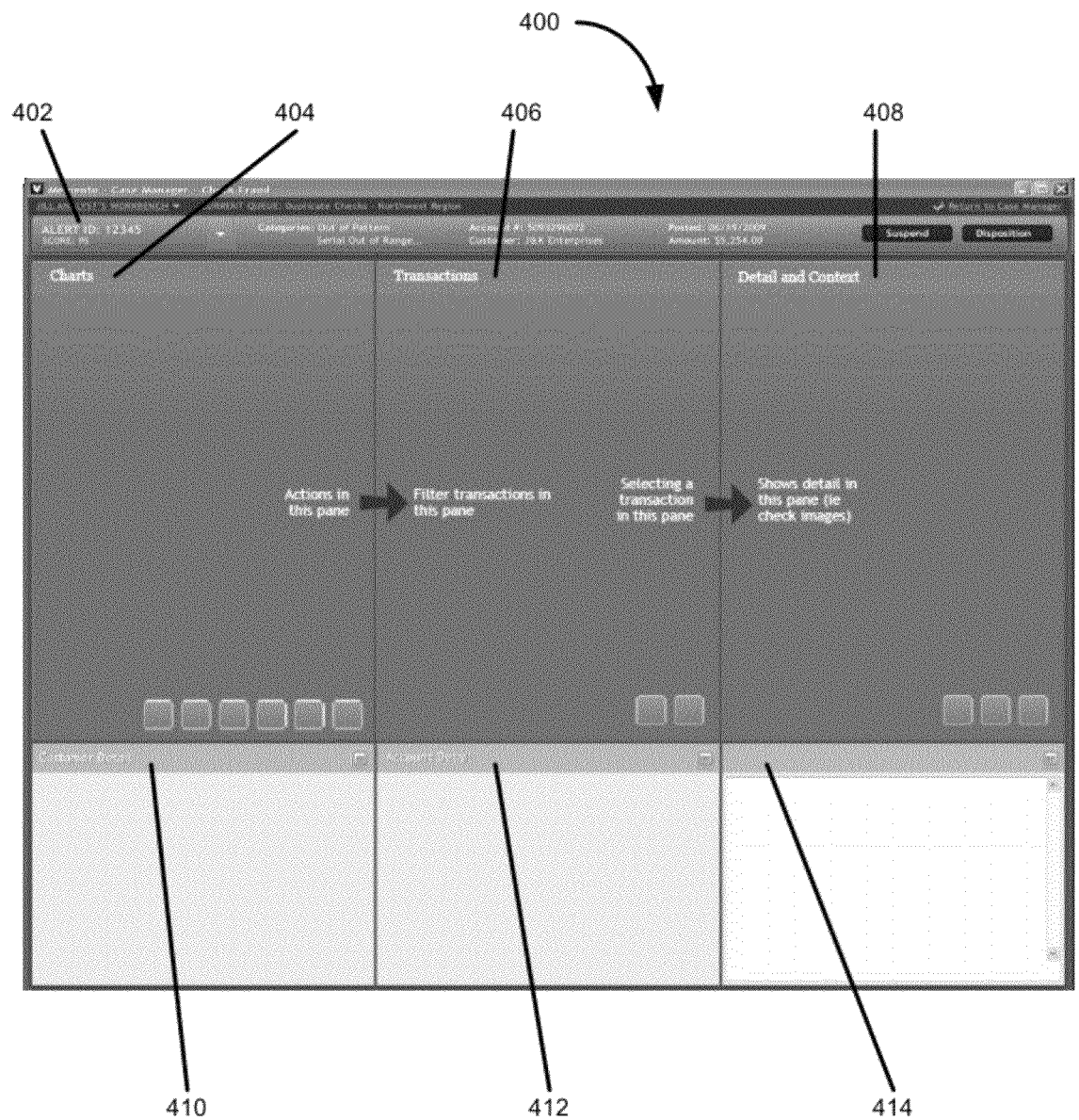
FIG. 4 is an exemplary illustration of a fraud alert driven user interface.

As discussed above, some examples are directed toward a fraud alert driven user interface that presents user interface components specially configured to display fraud detection information. FIG. 4 illustrates one example of a fraud alert driven user interface 400 prior to receiving a fraud alert. As shown, the user interface 400 includes an alert panel 402, a chart frame 404, a transactions frame 406, a detail and content frame 408, a customer detail frame 410, an account detail frame 412 and a notes frame 414. The alert panel 402 is configured to present summary information regarding a fraud alert. This summary information may include one or more reasons that the fraud alert was generated and alert content included in the fraud alert. For instance, as shown in FIG. 4, the alert panel 402 includes an analyst bar and an alert bar. The analyst bar provides information identifying the user and the queue that the user is working. The alert bar displays an alert score and reason code information indicating one or more reason codes included in the fraud alert. In the illustrated example, the reason code information is referred to as "Categories." Additionally, in some examples, the alert score is a metric that indicates the level of confidence that a potentially fraudulent activity is, in fact, fraudulent.

The chart frame 404 provides an area for specialized user interface components capable of visualizing a variety of summary-level fraud detection information. The particular visualization shown in the chart frame 404 depends on the reasons underlying a fraud alert. For instance, if the primary reason for the fraud alert is indicative of check fraud, the visualizations displayed in the chart frame 404 will focus on display of the potentially fraudulent item within the context of comparable, trustworthy items. Alternatively, if the primary reason for the fraud alert is indicative of deposit fraud, the visualizations displayed in the chart frame will aggregate large numbers of individual transactions to provide a user with an overall perspective of account activity.

As is explained further below, some of the components displayed in the chart frame 404 receive user requests to present alternative visualizations or to affect the information displayed in other components of the user interface 400. For instance, in the some examples, a user can filter, or restrict, the information shown in components included in the transactions frame 406 by interacting with components included the chart frame 404. Additionally, in some examples, the fraud detection interface 106 generates representations within the chart frame 404 from a variety of data sources including the transaction and reference database 116.

Continuing the example shown in FIG. 4, the transactions frame 406 provides an area for components that display midlevel transactional information to a user. As discussed below, the particular transaction information displayed within the transaction frame 406 varies based on the reasons underlying the fraud alert and the information selected within the chart frame 404. Also, in some examples, the components included in the transaction frame 406 interact with the user to select particular transactional information or to affect the information displayed in other components of the user interface 406. For instance, in the these examples, the user can filter, or restrict, the information shown in the detail and content frame 408 by interacting with one or more components included the transaction frame 406.

As shown, the detail and content frame 408 provides an area to display further details regarding the fraud alert. The particular detail information displayed is based on the reasons underlying the fraud alert and the information selected within the transaction frame 406. According to some examples, this detailed information further documents the characteristics of the transactions selected in the transactions frame 406 and may include information gathered from other systems.

In the example shown, frames 410, 412 and 414 provide an area to display additional context to the user investigating a fraud alert. The customer detail frame 410 is configured to present customer related information and, in some examples, displays customer information such as name, address, social security number and accounts associated with a customer. Like other components described above, the customer detail frame 410 interacts with a user and allows a user to affect the information displayed in other components of the user interface 406. For instance, in the illustrated example, a user can select a particular account within the customer details frame 410 and thereby cause the account details frame 412 to display information regarding the selected account. The account details frame 412 is configured to display account related information. In some examples, the account details frame 412 displays information such as account type, account status and balance information. The notes frame 414 is configured to interact with the user to record information pertinent to the fraud alert under investigation.

Figure 5:
FIG. 5 is another exemplary illustration of a fraud alert driven user interface.

FIG. 5 illustrates the fraud alert driven user interface 400 from FIG. 4 after the presentation engine 112 has received and processed a fraud alert with a primary reason code that indicates potential check fraud. In the example shown, the analytics engine 108 issued the fraud alert because a check was presented with a relatively normal amount, a serial number that was out of sequence and a period of time between the current presentment and a previous presentment from the same check book transgress a threshold. The presentation engine 112 has altered the alert panel 402 to display this reason along with customer information, account information and the serial number of the potentially fraudulent check, which in this instance is 501. The presentation engine 112 has also altered the chart frame 404 to include a specialized user interface component 500, referred to as "Serial×Date Presented," that plots point representations of checks within a two-dimensional grid. In the illustrated example, these representations of checks take the form of small white squares. As shown, the vertical axis of the grid represents the serial numbers of checks presented for this account and the horizontal axis of the grid represents the dates that the checks were presented. The Serial×Date Presented component 500 also displays a comparable item, namely check #1373, which presentation engine 112 or the analytics engine 108 deems as authentic. This comparable item is presented to provide the user with context in which to investigate and evaluate the authenticity of the potentially fraudulent item, check #501. The Serial×Date Presented component 500 is configured to change the comparable item responsive to a selection, by the user, of another representation of a check within the grid. Furthermore, in the illustrated example, the chart frame 404 also includes a set of alternative visualization components 502 that are selectable by the user to change the user interface component displayed in the chart frame 404.

In addition, as shown in FIG. 5, the presentation engine 112 has altered the transactions frame 406 to include a specialized user interface component 504, referred to as "Checks," that presents an image of the potentially fraudulent check #501 and the comparable check #1373. The presentation engine 112 has also modified the detail and content frame 408 to include a specialized user interface component 506, referred to as "Additional Check Views," that presents additional images of the checks shown in the Checks component 504. In this example, the fraud detection user interface 106 receives these images via a system interface between the fraud detection user interface 106 and an external check imaging system. Upon receiving an indication that the user wishes to compare the potentially fraudulent check against another comparable item, the presentation engine 112 changes the images presented in the Checks component 504 and the Additional Check Views component 506 to images associated with the new comparable item. Also, in this example, the presentation engine 112 highlights the potentially fraudulent item with a red color and the comparable item with a green color to further distinguish the two. In other examples, the presentation engine 112 uses other highlighting methods such as changing the characteristics of the font or causing font to flash and examples are not limited to a particular highlighting technique. In addition, although the example shown in FIG. 5 presents a particular set of visual representations for checks and a particular orientation of axes and gridlines, other examples may employ other representations and orientations and examples are not limited to specific representations or orientations.

FIG. 6 illustrates the fraud alert driven user interface 400 from FIG. 5 after the presentation engine 112 has received and processed a user request for an alternative visualization from the set of alternative visualization components 502. The presentation engine 112 has altered the chart frame 404 to include a specialized user interface component 600, referred to as "Serial×Order Presented," that plots point representations of checks within a two-dimensional grid. In the illustrated example, the vertical axis of the grid represents the serial numbers of checks presented for this account and the horizontal axis of the grid represents the dates on which the checks were presented. In comparison to other user interface components that present date based views, order based views spread out clusters of check activity so that the representations of the checks are equally spaced along the axis that represents the order of presentment.

In the illustrated example, the Serial×Order Presented component 600 also displays representations of check books associated with the checks. These representations take the form of green lines extending from left to right within the grid. Like the comparable item, these representations are presented to provide the user with context in which to investigate and evaluate the authenticity of the potentially fraudulent item, check #501. In some examples, the representation of the check book is drawn with a slope, or other indication, that represents the rate at which checks have been historically presented from each check book. Checks whose representations fall closer to such a representation of a check book are more likely to be authentic. The Serial×Order Presented component 600 is configured to drill down into a particular check book responsive to the user selecting the representation of the check book within the grid.

FIG. 7 illustrates the fraud alert driven user interface 400 from FIG. 6 after the Serial×Order Presented component 600 has received and processed a user request to drill down into a particular check book, which in this instance is "Book 1100-1400." In the illustrated example, the Serial×Order Presented component 700 displays, in addition to the representation of a check book described with regard to FIG. 6, a representation of a set of reference serial numbers associated with the check book. In the illustrated example, the representation of the reference serial numbers takes the form of a green zone or range extending from the representation of the check book within the grid. In some examples, the representation of the reference serial numbers is drawn to indicate all serial numbers within which serial numbers of presented checks may fall and be within one standard deviation of their expected serial numbers. In these examples, the standard deviation and the expected value of the serial numbers are calculated from a population of authentic checks associated with the account. Checks whose representations fall within such a representation of the reference serial numbers are more likely to be authentic.

Like the comparable item, the representation of the reference serial numbers is displayed to provide the user with context in which to investigate and evaluate the authenticity of a potentially fraudulent item. In the illustrated example, check number #501 appears risky and fraudulent because its representation falls outside of the zone representation of the reference serial numbers and therefore varies from the normal, expected value for serial number by more than one standard deviation. Conversely, check number #1373 is less risky and appears to be authentic because its representation falls within the zone.

While the illustrated example employs a zone to represent reference values of a single attribute, examples are not limited to a particular number of attributes. For instance, other examples may employ cylinders or other three dimensional geometric figures to represent reference values of two attributes. Thus, examples are not limited to a particular number of reference values or attributes.

FIG. 8 illustrates the fraud alert driven user interface 400 from FIG. 5 after the presentation engine 112 has received and processed a user request for an alternative visualization from the set of alternative visualization components 502. The presentation engine 112 has altered the chart frame 404 to include a specialized user interface component 800, referred to as "Amount×Date Presented," that plots point representations of checks within a two-dimensional grid. In the illustrated example, the vertical axis of the grid represents the amount of the checks presented for this account and the horizontal axis of the grid represents the date that the checks were presented.

In the illustrated example, the Amount×Date Presented component 800 also displays representations of checks that the analytics engine 108 has determined are quasi-periodically re-occurring checks, i.e. checks with periodically re-occurring amounts. These representations take the form of de-emphasized, horizontal gray lines extending from left to right within the grid. As shown, these representations link each quasi-periodically re-occurring check into a group of quasi-periodically re-occurring checks. In addition, these representations may be present at all times during the display of the Amount×Date Present component 800 or may only be visible where a mouse, or other input device, hovers over one of the members of the periodically re-occurring group of checks Like the comparable item, these representations are presented to provide the user with context in which to investigate and evaluate the authenticity of the potentially fraudulent item, check #501.

Periodically re-occurring checks are lower risk items and therefore provide a sound basis for comparison with potentially fraudulent items. In some examples, representations of the periodically re-occurring checks are drawn with characteristics that differentiate the periodically re-occurring checks from the non-periodically re-occurring checks, thereby highlighting the non-periodically re-occurring checks for additional scrutiny. For instance, according to one example, the Amount×Date Presented component 800 displays periodically re-occurring checks as gray circles rather than white squares.

FIG. 9 illustrates the fraud alert driven user interface 400 from FIG. 5 after the presentation engine 112 has received and processed a user request for an alternative visualization from the set of alternative visualization components 502. The presentation engine 112 has altered the chart frame 404 to include a specialized user interface component 900, referred to as "Dollar Variance×Serial Variance," that plots point representations of checks within a two-dimensional grid. In the illustrated example, the vertical axis of the grid represents the variance between the actual presented amount and an expected amount for each presented check associated with an account and the horizontal axis of the grid represents the variance between the actual presented serial number and an expected serial number for each presented check associated with the account. According to this example, the expected amounts and serial numbers are determined with reference to a population of authentic checks associated with the account.

In the illustrated example, the Dollar Variance×Serial Variance component 900 also displays representations of reference values for amounts and serial numbers. These reference values are calculated from the population of authentic checks associated with the account. In the illustrated example, the representations of the reference values take the form of concentric circles. Each concentric circle is shaded green, with the shading of larger circles have greater transparency relative to smaller circles. In some examples, the representations of the reference values are drawn to reflect all amounts and serial numbers within which actual presented amounts or serial numbers of checks may fall and be within some predetermined number of standard deviations from their expected amount and serial number.

Also as shown in this example, the Dollar Variance×Serial Variance component 900 includes three concentric circles. The smallest concentric circle represents the amounts and serial numbers of checks that fall within one standard deviation of their expected amount and serial number. The next largest concentric circle represents the amounts and serial numbers of checks that fall within two standard deviations of their expected amount and serial number, and the largest concentric circle represents the amounts and serial numbers of checks that fall within three standard deviations of their expected amount and serial number. The closer the representation of any given check is to the center of the Dollar Variance×Serial Variance component 900, the lower the risk associated with the check. This is so because fraudulent checks are not generally presented with amounts and serial numbers that are relatively close to amounts and serial numbers of authentic checks. In fact, fraudulent checks are more likely to be extreme with regard to these attributes. Hence the relative risk of a check being fraudulent increases as the attributes of the check cause its representation to move from the origin, and particularly when its representation moves into the first quadrant.

In the illustrated example, check number #501 appears fraudulent because its representation falls outside of the third concentric circle. In particular, the amount of check number #501 varies from the normal, expected value by more than three standard deviations and the serial number varies from the normal, expected value by more than two standard deviations. Conversely, check number #1373 appears to be authentic because its representation falls within the first concentric circle.

While the illustrated example employs concentric circles to represent reference values of two attributes, examples are not limited to a particular number of attributes or a particular geometry. Some examples may employ other shapes, such as squares, rectangles, or any other regular or irregular polygons. Other examples may employ spheres or other higher dimensional shapes to represent reference values of a plurality of attributes. Thus, examples are not limited to a particular number of reference values, attributes or a particular geometric representation thereof.

Similarly, while the example shown in FIG. 9 displays reference values that are based on the standard deviation of a population of checks, other examples may employ other measures and representations of rareness. For instance, some examples may display reference values that are level sets of the relative risk of a given pair of attributes being fraudulent as compared to the risk that a pair of attributes corresponding to the origin is fraudulent. This particular choice is especially useful where training examples that are known to be fraudulent are available.

Figure 10:
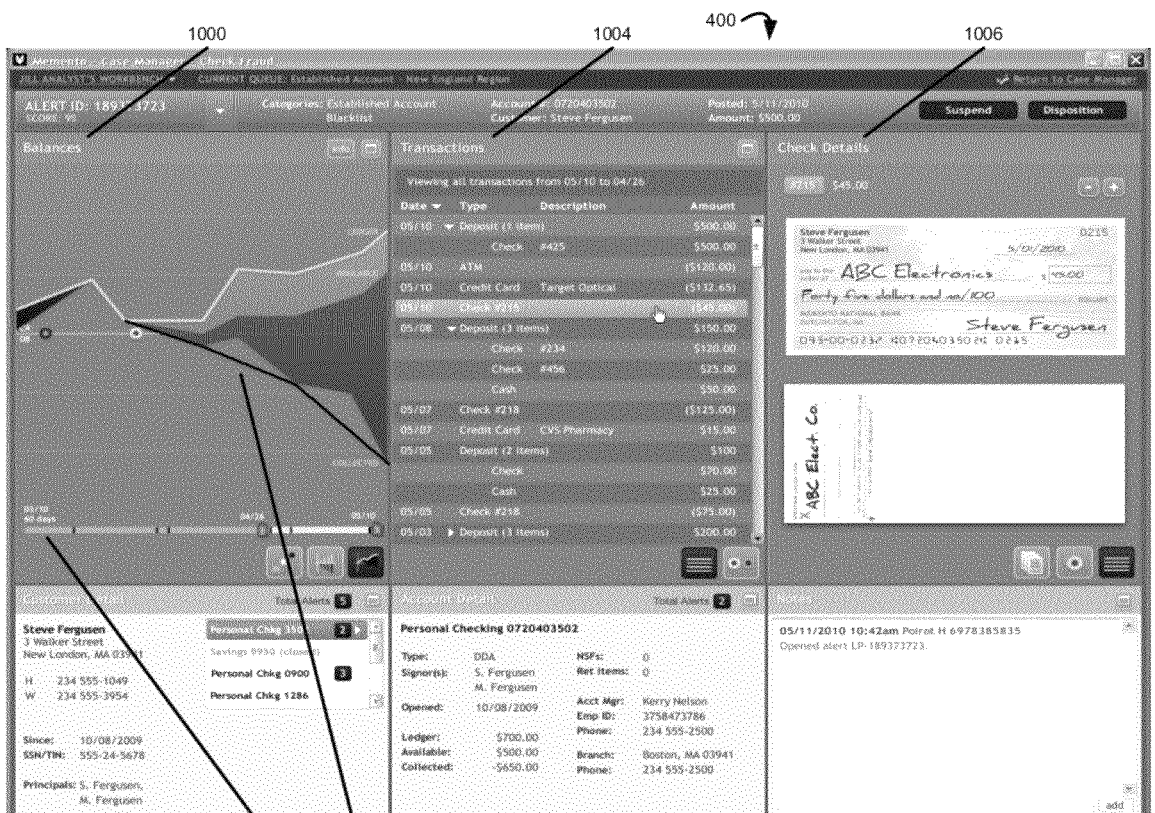
FIG. 10 is another exemplary illustration of a fraud alert driven user interface.

FIG. 10 illustrates the fraud alert driven user interface 400 from FIG. 4 after the presentation engine 112 has received and processed a fraud alert with a primary reason code that indicates potential deposit fraud. In the example shown, the analytics engine 108 issued the fraud alert because of unusual activity associated with the account that has caused a divergence between three account balance metrics: ledger balance, available balance and collected balance. The ledger balance represents the amount of money reported to a customer in response to a balance inquiry. The available balance represents the amount of money to which a customer can actually gain access. The collected balance is the amount of deposited money that the financial institution has collected. Divergence of these three metrics is indicative of an account in stress and that exposes the back to risk of loss.

As shown in FIG. 10, the presentation engine 112 has altered the alert panel 402 to display the reason for the fraud alert along with customer information, account information and the current date. The presentation engine 112 has also altered the chart frame 404 to include a specialized user interface component 1000, referred to as "Balances," that plots representations of the ledger balance, the available balance and the collected balance over a particular period of time. The period of time presented by the Balances component 1000 is represented and controlled by a specialized timeline control component 1002.

In the illustrated example, the Balances component 1000 has set the timeline control 1002 to the time period designated as relevant by the analytics engine 108 within the alert content. However, the timeline control 1002 is configured to modify the period of time displayed by the Balances component 1000 responsive to requested change by the user. In addition, as shown in FIG. 10, the timeline control 1002 includes indications of past fraud alerts embedded within the control itself. These indications provide a user with additional context when investigating potentially fraudulent activities.

As depicted in FIG. 10, the Balances component 1000 represents each of the balance metrics by a line drawn between point representations of the daily values of each metric. The Balances component 1000 also highlights differences between the balance metrics. In the illustrated example, the representation of the ledger balance is drawn in blue and the representations of the available balance and the ledger balance are drawn in red. The area between the ledger balance and the available balance is shaded in blue. This shade of blue in this area has a higher transparency than the representation of the ledger balance. The area between the available balance and the collected balance is shaded in red. Furthermore, the presentation engine 112 has affixed a lower concave hull 1008 to the collected balance to represent the overall trend of the account distress.

In addition, as shown in FIG. 10, the presentation engine 112 has altered the transactions frame 406 to include a specialized user interface component 1004, referred to as "Alert History," that presents a summary of previous fraud alerts generated for the account under investigation. The Alert History component 1004 is configured to receive one or more indicators from a user that designate particular historical alerts of interest. The presentation engine 112 has also modified the detail and content frame 408 to include a specialized user interface component 1006, referred to as "Alert Details," that presents details for previous fraud alerts. Upon receiving an indicator that the user has selected one or more particular historical alerts displayed within the Alert History component 1004, the Alert Details component 1006 displays detailed information from the transaction and reference database 116 regarding the indicated historical fraud alerts.

Figure 11:
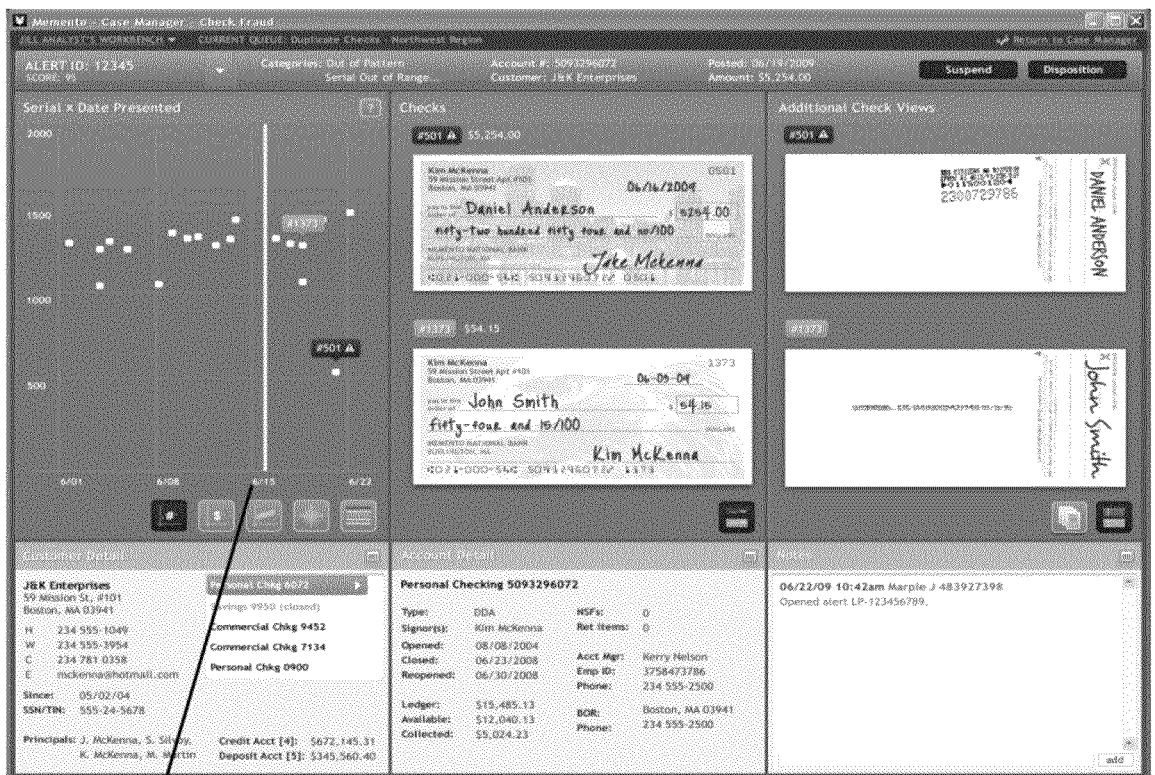
FIG. 11 is another exemplary illustration of a fraud alert driven user interface.

FIG. 11 illustrates the fraud alert driven user interface 500 from FIG. 5 after the presentation engine 112 has received and processed a fraud alert with a primary reason code that indicates potential takeover of the account by a third party. In the example shown, the presentation engine 112 has inserted the gridline 1100 to indicate the date on with reference information associated with the account was changed.

Figure 12:
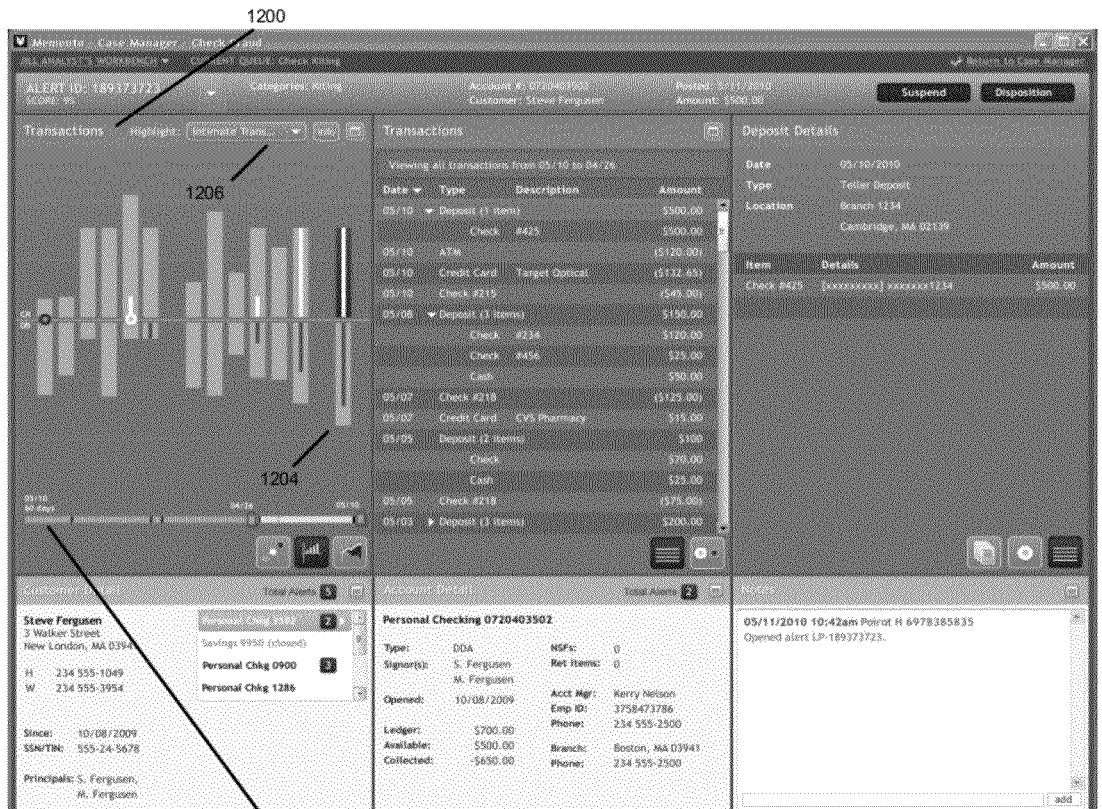
FIG. 12 is another exemplary illustration of a fraud alert driven user interface.

FIG. 12 illustrates the fraud alert driven user interface 400 from FIG. 4 after the presentation engine 112 has received and processed a fraud alert with a primary reason code that indicates potential check kiting. In the example shown, the presentation engine 112 has altered the alert panel 402 to display the reason for the fraud alert along with customer information, account information and the current date. The presentation engine 112 has also altered the chart frame 404 to include a specialized user interface component 1200, referred to as "Transactions," that plots, within a two dimensional grid, representations of the transactions that have occurred within an account over a particular period of time. In the illustrated example, the vertical axis of the grid represents an amount debited or credited and the horizontal axis of the grid represents a time period in which the transaction occurred. As shown, the Transactions component 1200 includes a set of bars that represent the amounts debited and credited to the account being analyzed. One such bar representation is the bar representation 1204. Further, each bar representation includes a representation of a portion of the debited or credited amount that is associated with an identified account. These identified accounts may include a variety of accounts, such as checking accounts in general, one or more specific checking accounts or accounts that are intimately associated with the account being analyzed. In the example shown, the bar representation 1204 includes a black line that represents a debited amount that is associated with one or more intimate accounts. In particular, the black line represents $145 that was deposited on May 8$^{th}$ via checks drawn on a checking account that is intimately related to the account being analyzed.

According to various examples, the Transaction component 1200 includes a number of parameters for configuring the visualizations displayed. For instance, in some examples, the Transactions component 1200 includes a filtering component 1206 that toggles display of information within the Transaction component 1206. In these examples, the types of visualizations that may be toggled on or off by the filtering component 1206 include representations of to specific transaction types, such as debits, credits, check deposits and point of sale transactions, representations of particular balance types, such as ledger balance, available balance and collected balance, and trend lines that represent average credit amount over time, average debit about over time and minimums and maximums within the period of time presented. The period of time presented by the Transactions component 1200 is represented and controlled by a specialized timeline control component 1202 that functions in accord with the timeline control component 1002 describe above with regard to FIG. 10. Thus, the Transaction component 1200 allows a user to modify the components displayed during the course of any analysis performed.

As depicted in FIG. 12, the Transactions component 1200 includes several context layers that may be shown based on the reason codes included in a fraud alert. In the example shown, the Transactions component 1200 includes a stacked bar chart that is segmented by intimate and non-intimate transactions. As shown, these bar chart components indicate a cyclical flow of money between intimate accounts which is the characteristic of kiting fraud.

Having thus described several aspects of at least one example, it is to be appreciated that various alterations, modifications, and improvements will readily occur to those skilled in the art. For instance, while the bulk of the specification discusses detection of check fraud, examples disclosed herein may also be used in other contexts such as to detect other categories of fraud within industries other than the financial industry, such as the healthcare industry. Such alterations, modifications, and improvements are intended to be part of this disclosure, and are intended to be within the scope of the examples discussed herein. Accordingly, the foregoing description and drawings are by way of example only.

What is claimed is:

1. A system for providing information regarding a suspect activity identified as potentially fraudulent, the system comprising:
   a memory storing data describing a plurality of valid activities, each valid activity of the plurality of valid activities having a plurality of attributes, each attribute of each plurality of attributes having a value; and
   an interface coupled to the memory and configured to:
      receive an indication of the suspect activity;
      present a representation of the suspect activity;
      present a plurality of representations of valid activities that share at least one common characteristic with the suspect activity; and
      present a link between a first representation of the plurality of representations and second representation of the plurality of representations, wherein the first representation represents a first valid activity including at least one first attribute having a quasi-periodically re-occurring value and the second representation represents a second valid activity including at least one second attribute having the quasi-periodically re-occurring value.

2. The system according to claim 1, wherein the suspect activity includes presentation of a check.

3. The system according to claim 1, wherein the link includes a line between the first representation and the second representation.

4. The system according to claim 1, wherein the first representation and the second representation each have a shape that is different from other representations of the plurality of representations and the representation of the suspect activity.

5. The system according to claim 4, wherein the first representation and the second representation are de-emphasized relative to the other representations and the representation of the suspect activity.

6. The system according to claim 1, wherein the interface is further configured to present a plurality of axes, each axis of the plurality of axes indicating a set of potential values of an attribute of the suspect activity.

7. The system according to claim 6, wherein the suspect activity includes presentation of a check, the check having an amount and a date of presentation and the plurality of axes includes a first axis and a second axis, the first axis indicating a set of potential values for the date of presentation and the second axis indicating a set of potential values for the amount.

8. A computer implemented method for providing information regarding a suspect activity identified as potentially fraudulent, the method comprising:
   storing data describing a plurality of valid activities in a memory, each valid activity of the plurality of valid activities having a plurality of attributes, each attribute of each plurality of attributes having a value;
   receiving, via an interface, an indication of the suspect activity;
   presenting, via the interface, a representation of the suspect activity;

presenting, via the interface, a plurality of representations of valid activities that share at least one common characteristic with the suspect activity; and presenting, via the interface, a link between a first representation of the plurality of representations and second representation of the plurality of representations, wherein the first representation represents a first valid activity including at least one first attribute having a quasi-periodically re-occurring value and the second representation represents a second valid activity including at least one second attribute having the quasi-periodically re-occurring value.

9. The method according to claim 8, wherein receiving, via the interface, the indication of the suspect activity includes receiving an indication of a presentation of a check.

10. The method according to claim 8, wherein presenting, via the interface, the link includes presenting a line between the first representation and the second representation.

11. The method according to claim 8, wherein presenting, via the interface, a plurality of representations includes presenting the first representation and the second representation with a shape that is different from other representations of the plurality of representations and the representation of the suspect activity.

12. The method according to claim 11, wherein presenting the first representation and the second representation includes presenting the first representation and the second representation as de-emphasized relative to the other representations and the representation of the suspect activity.

13. The method according to claim 8, further comprising presenting a plurality of axes, each axis of the plurality of axes indicating a set of potential values of an attribute of the suspect activity.

14. The method according to claim 13, wherein receiving, via the interface, the indication of the suspect activity includes receiving an indication of a presentation of a check, the check having an amount and a date of presentation and presenting the plurality of axes includes presenting a first axis and a second axis, the first axis indicating a set of potential values for the date of presentation and the second axis indicating a set of potential values for the amount.

15. A non-transitory computer readable medium having instructions stored thereon that, when executed by at least one processor, instruct the at least one processor to perform a method of providing information regarding a suspect activity identified as potentially fraudulent, the method comprising:

storing data describing a plurality of valid activities, each valid activity of the plurality of valid activities having a plurality of attributes, each attribute of each plurality of attributes having a value;

receiving an indication of the suspect activity;

presenting a representation of the suspect activity;

presenting a plurality of representations of valid activities that share at least one common characteristic with the suspect activity; and presenting a link between a first representation of the plurality of representations and second representation of the plurality of representations, wherein the first representation represents a first valid activity including at least one first attribute having a quasi-periodically re-occurring value and the second representation represents a second valid activity including at least one second attribute having the quasi-periodically re-occurring value.

16. The computer readable medium according to claim 15, wherein the instructions instruct the at least one processor to receive the indication of the suspect activity by receiving an indication of a presentation of a check.

17. The computer readable medium according to claim 15, wherein the instructions instruct the at least one processor to present the link by presenting a line between the first representation and the second representation.

18. The computer readable medium according to claim 15, wherein the instructions instruct the at least one processor to present a plurality of representations by presenting the first representation and the second representation with a shape that is different from other representations of the plurality of representations and the representation of the suspect activity.

19. The computer readable medium according to claim 18, wherein the instructions instruct the at least one processor to present the first representation and the second representation by presenting the first representation and the second representation as de-emphasized relative to the other representations and the representation of the suspect activity.

20. The computer readable medium according to claim 15, wherein the instructions further instruct the at least one processor to perform acts including presenting a plurality of axes, each axis of the plurality of axes indicating a set of potential values of an attribute of the suspect activity.

* * * * *